United States Patent
Immonen et al.

(10) Patent No.: US 8,565,685 B2
(45) Date of Patent: Oct. 22, 2013

(54) UTILIZATION-BASED THRESHOLD FOR CHOOSING DYNAMICALLY BETWEEN EAGER AND LAZY SCHEDULING STRATEGIES IN RF RESOURCE ALLOCATION

(75) Inventors: Antti Oskari Immonen, Helsinki (FI); Sami Olavi Johannes Kiminki, Helsinki (FI); Vesa Lauri Ilmari Hirvisalo, Helsinki (FI)

(73) Assignee: Nokia Corporation, Espoo (FI)

( * ) Notice: Subject to any disclaimer, the term of this patent is extended or adjusted under 35 U.S.C. 154(b) by 117 days.

(21) Appl. No.: 13/016,288

(22) Filed: Jan. 28, 2011

(65) Prior Publication Data
US 2012/0196635 A1    Aug. 2, 2012

(51) Int. Cl.
*H04B 17/00*      (2006.01)
(52) U.S. Cl.
USPC .................................................. 455/67.11
(58) Field of Classification Search
USPC .................................................... 455/67.11
See application file for complete search history.

(56) References Cited

U.S. PATENT DOCUMENTS

| | | | |
|---|---|---|---|
| 2006/0090161 A1* | 4/2006 | Bodas et al. | 718/100 |
| 2006/0109961 A1* | 5/2006 | Mahesh et al. | 379/93.25 |
| 2007/0043960 A1* | 2/2007 | Bose et al. | 713/300 |
| 2008/0081663 A1* | 4/2008 | Kasslin et al. | 455/557 |
| 2008/0161030 A1* | 7/2008 | Pernu | 455/509 |
| 2008/0240021 A1* | 10/2008 | Guo et al. | 370/328 |
| 2009/0146791 A1* | 6/2009 | Jantunen et al. | 340/10.2 |
| 2009/0191862 A1* | 7/2009 | Amirijoo et al. | 455/424 |
| 2009/0328058 A1* | 12/2009 | Papaefstathiou et al. | 718/107 |
| 2010/0030850 A1* | 2/2010 | Onjo | 709/203 |
| 2011/0119538 A1* | 5/2011 | Ipek et al. | 714/719 |
| 2011/0145795 A1* | 6/2011 | Khanapurkar et al. | 717/126 |
| 2012/0044828 A1* | 2/2012 | Seo et al. | 370/252 |
| 2012/0087314 A1* | 4/2012 | Maeda et al. | 370/328 |
| 2012/0159496 A1* | 6/2012 | Dighe et al. | 718/102 |
| 2013/0061239 A1* | 3/2013 | Lahav et al. | 718/108 |

OTHER PUBLICATIONS

M. Balakrishnan, "RT-Level Synthesis Based on Integrated Scheduling and Binding", Institute for Informatik der University Kiel Ollshausenstr., Kiel, W. Germany, Dec. 1988, 46 pages.

* cited by examiner

*Primary Examiner* — Bobbak Safaipour
(74) *Attorney, Agent, or Firm* — Squire Sanders (US) LLP

(57) ABSTRACT

Embodiment are directed to an apparatus and/or method of dynamically selecting scheduling strategies in resource allocation. The method includes measuring a multi-radio radio frequency hardware scheduling workload, comparing the measured multi-radio radio frequency hardware scheduling workload with a threshold, and dynamically selecting a more optimal shared hardware component scheduling strategy based on a result of the comparing.

17 Claims, 4 Drawing Sheets

UTILIZATION-BASED THRESHOLD FOR CHOOSING DYNAMICALLY BETWEEN EAGER AND LAZY SCHEDULING STRATEGIES IN RF RESOURCE ALLOCATION

BACKGROUND

1. Field

Embodiments discussed herein relate to wireless communication, such as multi-radio or cognitive radio.

2. Description of the Related Art

Multi-radio or cognitive radio refers to a framework for wireless communication where a network or wireless node change their transmission and/or reception parameters so as to communicate more efficiently by avoiding interference with other licensed or unlicensed nodes or users. The change of transmission or reception parameters can be based on the active monitoring of a number of factors within the internal and external radio environment, including radio frequency spectrum, user behavior, and network state.

Full cognitive radio is a type of cognitive radio in which every possible parameter observable by the network or wireless node is taken into account when deciding on transmission and reception changes. Spectrum sensing cognitive radio is a type of cognitive radio in which only the radio frequency spectrum is considered when deciding on transmission and reception changes. Further, cognitive radio can be distinguished on the basis of the parts of the spectrum available. For instance, licensed band cognitive radio refers to cognitive radio that is capable of using bands assigned to licensed users; whereas unlicensed band cognitive radio refers to cognitive radio that can only utilize unlicensed parts of the radio frequency spectrum.

As mentioned above, one function of cognitive radio is to utilize spectrum sensing techniques to detect the unused spectrum and use it while avoiding harmful interference with other nodes or users. Another function of cognitive radio is to provide spectrum management functions by capturing the best available spectrum band to meet communication requirements, such as quality of service requirements. Cognitive radio also supports spectrum mobility by allowing a cognitive radio user to exchange its frequency of operation. In addition, cognitive radio can provide spectrum sharing by providing a fair spectrum scheduling method.

SUMMARY

One embodiment is directed to a method of dynamically selecting scheduling strategies in resource allocation. The method includes measuring a multi-radio radio frequency hardware scheduling workload, comparing the measured multi-radio radio frequency hardware scheduling workload with a threshold, and dynamically selecting a more optimal shared hardware component scheduling strategy based on a result of the comparing.

Another embodiment is directed to an apparatus. The apparatus includes at least one processor, and at least one memory including computer program code. The at least one memory and the computer program code are configured, with the at least one processor, to cause the apparatus at least to measure a multi-radio radio frequency hardware scheduling workload, to compare the measured multi-radio radio frequency hardware scheduling workload with a threshold, and to dynamically select a more optimal shared hardware component scheduling strategy based on a result of the comparison.

Another embodiment is directed to computer program embodied on a computer readable storage medium. The computer program is configured to control a processor to perform operations including measuring a multi-radio radio frequency hardware scheduling workload, comparing the measured multi-radio radio frequency hardware scheduling workload with a threshold, and dynamically selecting a more optimal shared hardware component scheduling strategy based on a result of the comparing.

BRIEF DESCRIPTION OF THE DRAWINGS

For proper understanding of the invention, reference should be made to the accompanying drawings, wherein.

DETAILED DESCRIPTION

Embodiments of the invention relate to multi-radio or cognitive radio, and methods in embedded control software and accompanying hardware to control complex radio applications in mobile devices. More specifically, embodiments may relate to resource allocation in the form of configuration scheduling in a multi-radio device with a common radio frequency (RF) platform where RF resources are shared, such as when multiple protocols use the same RF resources concurrently.

RF resources include the analog components without memory that are used to form the RF processing pipe. The actual hardware implementations, according to some embodiments, may be coarse-grain reconfigurable RF or analog parts of the software-defined radio (SDR) pipes, for example.

When multiple radio protocols are executed using shared hardware resources, the resources needed for each of the protocols are allocated. As a result, conflicts in resource usage are avoided. In order to allow for high utilization of hardware, fine-grain dynamic resource allocation, where the resources are allocated only when necessary, can be applied. As the system is dynamic, there is a limited window in time before the deadline for an allocation, during which information for the allocation decision exists.

Configuration scheduling is a mechanism for finding proper resource configurations and arbitrating the resources between radio tasks. Therefore, in one embodiment, configuration scheduling relates to assigning resources for certain tasks during certain time periods. In this context, an allocation request is called an allocation job, or, simply, a job.

Figure 1:
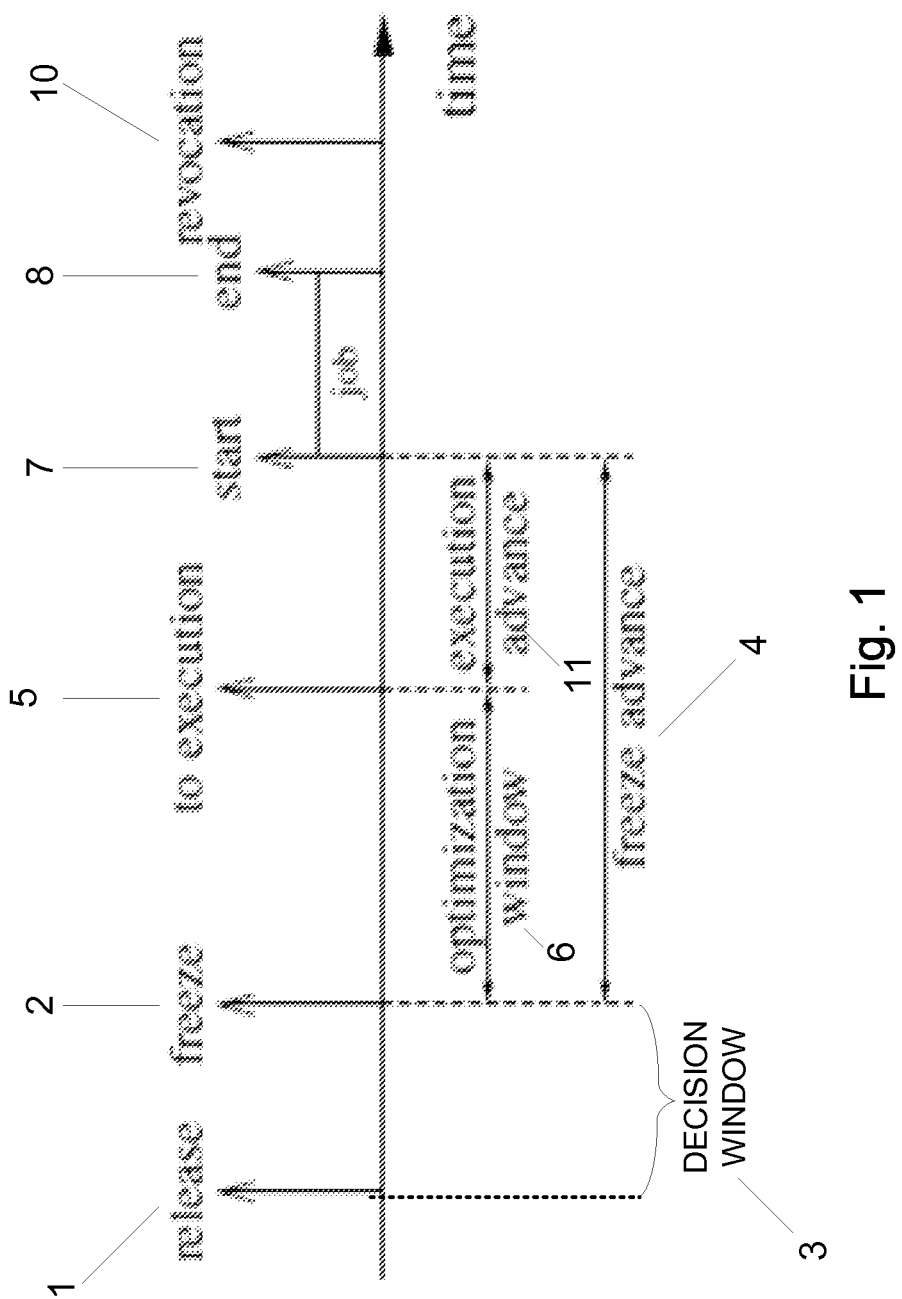
FIG. 1 illustrates an example of a timeline of a life cycle of a job, according to one embodiment.

FIG. 1 illustrates an example of the timeline of the life cycle of a job. The life cycle of a job is initiated when the allocation is requested by a radio task, such as a radio protocol. In scheduling terminology, the job is released 1. After the job is released 1, a scheduling decision is performed in which a configuration is found and the resources are allocated for the configuration. The time window for the scheduling decision, which is called the decision window 3, is between release 1 and freeze 2. The job is frozen at some point before it is due to start, and this time is called the freeze advance 4. This is mainly because the reconfiguration of the hardware is usually performed by another component called the dispatcher, and there might be some transfer delays. Optionally, the set of allocation jobs known to the scheduler may be optimized before execution requiring some additional computational effort, which adds further time to the freeze advance. After freeze 2, the job may no longer be modified by the original requester.

After freeze 2, the job is transferred to execution 5, which may include transferring the job to the dispatcher. In an embodiment, the dispatcher may be at a different chip. Before transfer to execution, a global job optimization may be performed, and thus, the time between freeze 2 and to execution 5 is called the optimization window 6. For example, two compatible jobs might share a single low noise amplifier (LNA) and, therefore, the configuration and the resource use of these two jobs might be partially merged.

The job starts 7 and completes 8, and the time between start and completion is referred to as the duration interval of the job 9. The allocated resources can be used, for example, to receive a long term evolution (LTE) subframe or to send a wide local area network (WLAN) frame. The requester may determine how the resources are used.

After the job has completed (i.e., passed the end), it is revoked 10. The revocation occurs at some time after completion 8. Revocation can simply mean cleaning up all the information of the job from the scheduler's data structures.

In one embodiment, as illustrated in FIG. 1, the optimization window 6 may be 0.5 ms and the execution advance 11 may be 0.5 ms. In this embodiment, the freeze advance 4 would be 1 ms. The job may be released 1 at any time before the freeze advance 4. If the job is released 5 ms before start 7, the decision window 3 would be 4 ms. The exact times for optimization window 6 and execution advance 11 may be system-dependent. The exact time of the release advance, or the time the job is released before start, is job-dependent.

It is noted that for simpler systems, optimization window 6 and/or execution advance 11 may be zero and, thus, degenerated. Embodiments of the invention can also apply to these systems, as there would still be a decision window.

The resource allocation, referred as the scheduling decision, can be performed as soon as the job is released 1, just in time before freeze 2, or at any time between. When the scheduling decision is performed as soon as the job is released, it is referred to as the eager scheduling strategy. Thus, in the eager scheduling strategy, the resource allocation is performed immediately when allocation requests are known. When the scheduling decision is performed just before freeze, it is referred to as the lazy scheduling strategy. In other words, under the lazy scheduling strategy, the resource allocation is delayed so as to be performed as late as possible.

According to one embodiment, the resource allocation includes resolving a context, which includes finding a resource combination of available resources that can be used to execute the job. The resource allocation may also include allocating the resources, and notifying the requester that the context is obtained. Of course, it may be that there are no resource combinations of available resources matching the job requirements. In this case, a negative notification can be made and the job may be instantly revoked.

The eager scheduling strategy can often yield better schedules, while the lazy strategy has the advantage of utilizing less processor and memory resources by the configuration scheduler. Increased use of processor and memory resources implies increased energy consumption and, therefore, can result in reduced battery life in the mobile devices. Thus, the lazy scheduling strategy can achieve less processor cycles, use less memory, and consume less energy. Accordingly, the lazy scheduling strategy may be preferable when the quality produced by this strategy is sufficient.

According to certain embodiments, the eager and lazy scheduling strategies differ in the time the scheduling decisions are made. However, the eager and lazy scheduling strategies do not necessarily change the way the actual context resolution algorithm works. In this embodiment, context resolution refers to allocating the datapath context in the reconfigurable array. As a result, the eager and lazy scheduling strategies relate to the decision window of scheduling, where the decision window is local or per scheduled job.

The eager and lazy scheduling strategies may be considered system-wide modes. As a result, in certain embodiments, they are applied to every job. Additionally, in certain embodiments, the size of the decision window is per job. Some jobs are released earlier than others relative to their start times. Further, changing between the eager and lazy scheduling implies no pauses to the system operation; it only changes the time of allocation decision, as mentioned above. Supporting both the eager and lazy scheduling strategies may not result in an overly complex implementation. It is only a matter of when the queue of released jobs is processed. Also, in some embodiments, the queue is likely needed with the eager-only implementation.

Embodiments of the invention provide a mechanism for a multi-radio system to be able to adapt the RF resource scheduling for light and heavy workloads. In one embodiment, this mechanism alters the time when the resource allocation, i.e., the decision, is done. According to one embodiment, a utilization threshold is used to determine when to switch between the lazy and eager scheduling strategies when allocating RF resources.

Figure 2:
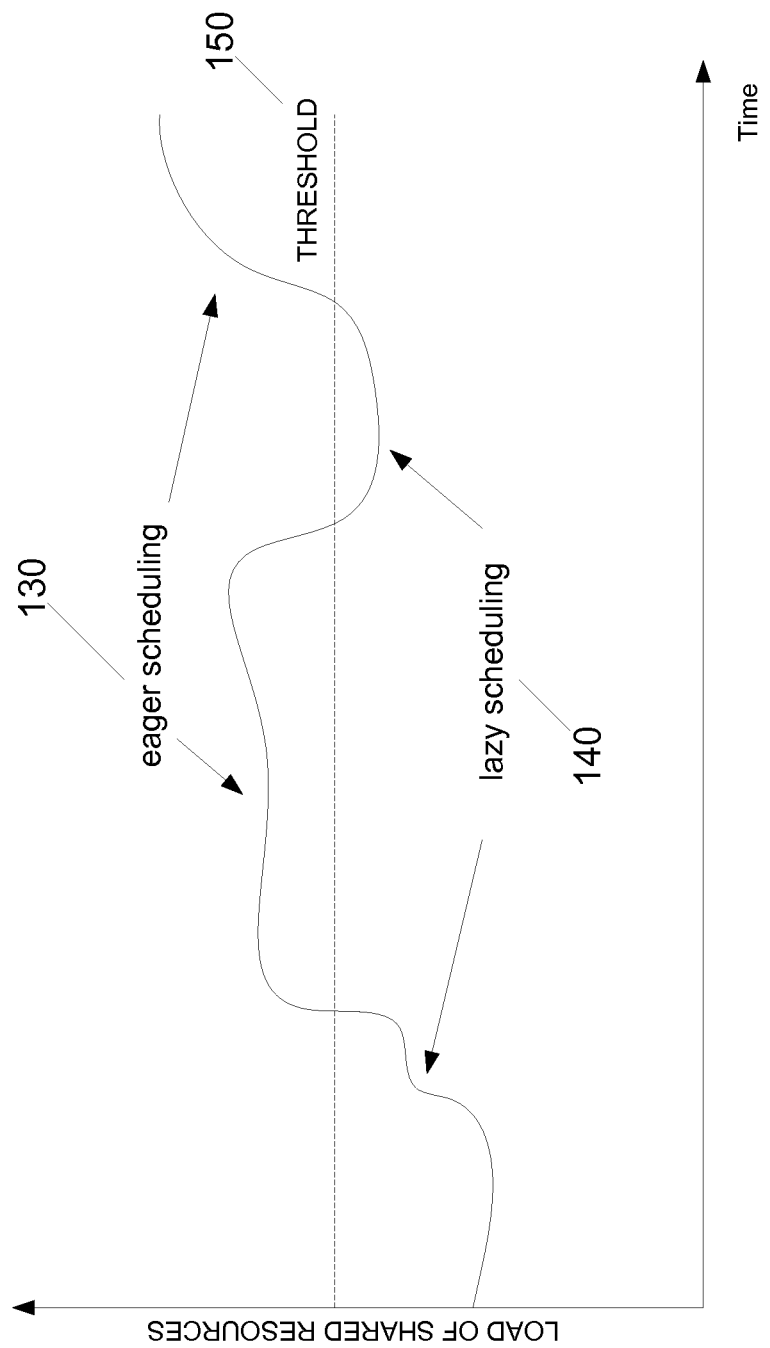
FIG. 2 illustrates a graph of an example of a scheduling strategy selection principle, according to one embodiment.

FIG. 2 illustrates a graph of an example of a scheduling strategy selection principle, according to one embodiment of the invention. As illustrated in FIG. 2, the lazy scheduling strategy 140 can be used when the load of shared resources is below a threshold 150. This may apply when the radio protocols are in low-performance modes relative to platform capabilities. As outlined above, using the lazy scheduling strategy can further reduce the use of processor and memory resources and, therefore, also reduce energy consumption. As further illustrated in FIG. 2, when the load of shared resources exceeds the threshold 150, the lazy scheduling strategy is not used. In this case, the eager scheduling strategy 130 is used to produce higher-quality allocation schedules. In one embodiment, the threshold can be chosen according to the implementers' wishes.

Further, in some embodiments, the threshold may be specific to the RF platform and the protocols that are executed on it. For example, for most protocols, missing one percent of the frames due to resource conflicts may be acceptable. However, for some protocols, such as the cellular, it may be desired that no frames are missed.

According to certain embodiments, the threshold may be determined by experimentation, such as by using a simulation procedure which could be included in design automation tools. For example, the platform design can be tested against a set of test cases or scenarios which either pass or fail. This procedure may be used to derive a table or another representation of combinations that can be executed by eager and lazy scheduling strategies. In other embodiments, current or future analytical methods for determining the threshold may be used. This may call for schedulability or schedule feasibility studies for the scheduling algorithms.

According to one embodiment, the general procedure for choosing between the eager and lazy scheduling strategies may be as follows:

1. Measuring the multi-radio RF hardware scheduling workload. For example, the measurement may be based on the rate of rejected jobs, the radio protocol modes including off-line, idle, scanning, active, multiple-input multiple-output (MIMO), etc., or the utilization rates of the RF hardware components. The radio protocol modes mentioned herein are examples and other modes are possible depending on the implementation, such as ad-hoc, infrastructure, and power-save for WLAN, and radio resource control connected or radio resource control idle for LTE.

2. Comparing the multi-radio RF hardware scheduling workload with the threshold.

3. Make a decision for alternating between eager and lazy scheduling strategies based on the result of the comparing step.

This procedure may be performed periodically, continuously, or it may be triggered by some events such as the mode change of a radio protocol.

Based on experimentation, it was found that using the lazy scheduling strategy on a non-constrained setup (i.e., no resource contention occurs between radio protocols) required 89% smaller maximum allocation table sizes and decreased the number of allocation table lookups by 4%, while producing schedules of quality equal to those of the eager scheduling strategy. If an allocation table is organized as a tree with 2 children per node, then, in this case, the smaller structure sizes would also result in a 53% reduction in required operations for allocation table lookups with maximum structure sizes.

However, when the resources were constrained (i.e., resource contention occurs), the lazy scheduling strategy was prone to priority inversion. This resulted in missing 5% of allocation requests of a higher-priority radio protocol in favor of a lower-priority protocol. The priority inversion anomaly was not present when using the eager scheduling strategy.

Figure 3:
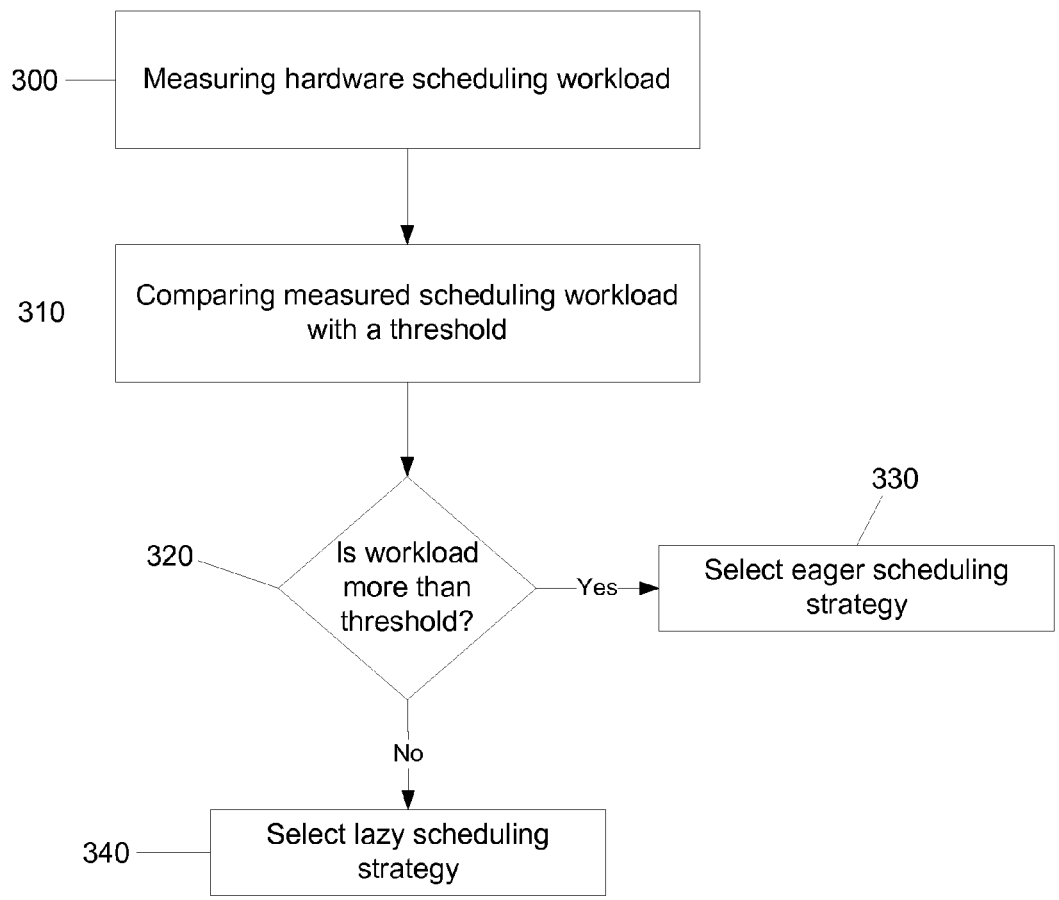
FIG. 3 illustrates an example of a flow chart of a method of resource scheduling, according to one embodiment.

FIG. 3 is an example of a flow chart illustrating a method of resource scheduling, according to one embodiment. As illustrated in FIG. 3, the method includes, at 300, measuring the scheduling workload, and, at 310, comparing the measured scheduling workload with a utilization threshold. In one embodiment, the scheduling workload is a multi-radio RF hardware scheduling workload. The method is then able to dynamically select the more optimal shared hardware component scheduling strategy based on the result of the comparison between the measured scheduling workload and the utilization threshold. More specifically, at 320, it is determined whether the scheduling workload exceeds the threshold. If the scheduling workload exceeds the threshold, then the eager scheduling strategy is selected at 330. If, however, the scheduling workload does not exceed the threshold, then the lazy scheduling strategy is selected at 340.

According to certain embodiments, the method described above can be stored as instructions on a computer readable medium and executed by a processor. The computer-readable medium may be a non-transitory medium that can be encoded with information that, when executed in hardware, performs a process corresponding to the process disclosed in FIG. 3, or any other process discussed herein. Examples of non-transitory mediums include a computer-readable medium, a computer distribution medium, a computer-readable storage medium, and a computer program product.

Further, the computer readable medium mentioned above may be at least partially embodied by a transmission line, a compact disk, digital-video disk, a magnetic tape, a Bernoulli drive, a magnetic disk, holographic disk or tape, flash memory, magnetoresistive memory, integrated circuits, or any other digital processing apparatus memory device.

In one embodiment, the selection between the eager and lazy selection strategies may be implemented in or performed by a network connection manager or similar component in a network stack of a mobile device, for example. Further, operation modes of different radio protocols can be accounted for. Examples of operation modes include off-line, idling, scanning for networks, low performance, high performance, and various MIMO modes. According to an embodiment, based on the operation mode, coarse utilization estimate(s) for resource use are calculated per radio protocol. The total system utilization estimate may be calculated by combining utilization estimates of individual radio protocols. Then, according to this embodiment, when the total system utilization estimate is above a certain platform-specific threshold, the eager scheduling strategy is used. Otherwise, the lazy scheduling strategy is used.

In addition, in some embodiments, scheduling metrics may also be used to select the eager strategy. For example, when the rate of allocation conflicts between radio protocols is above a certain level, the eager strategy may also be used. The rate of allocation conflicts may be calculated by comparing the number of accepted resource requests to the number of rejected resource requests over some time interval.

Figure 4:
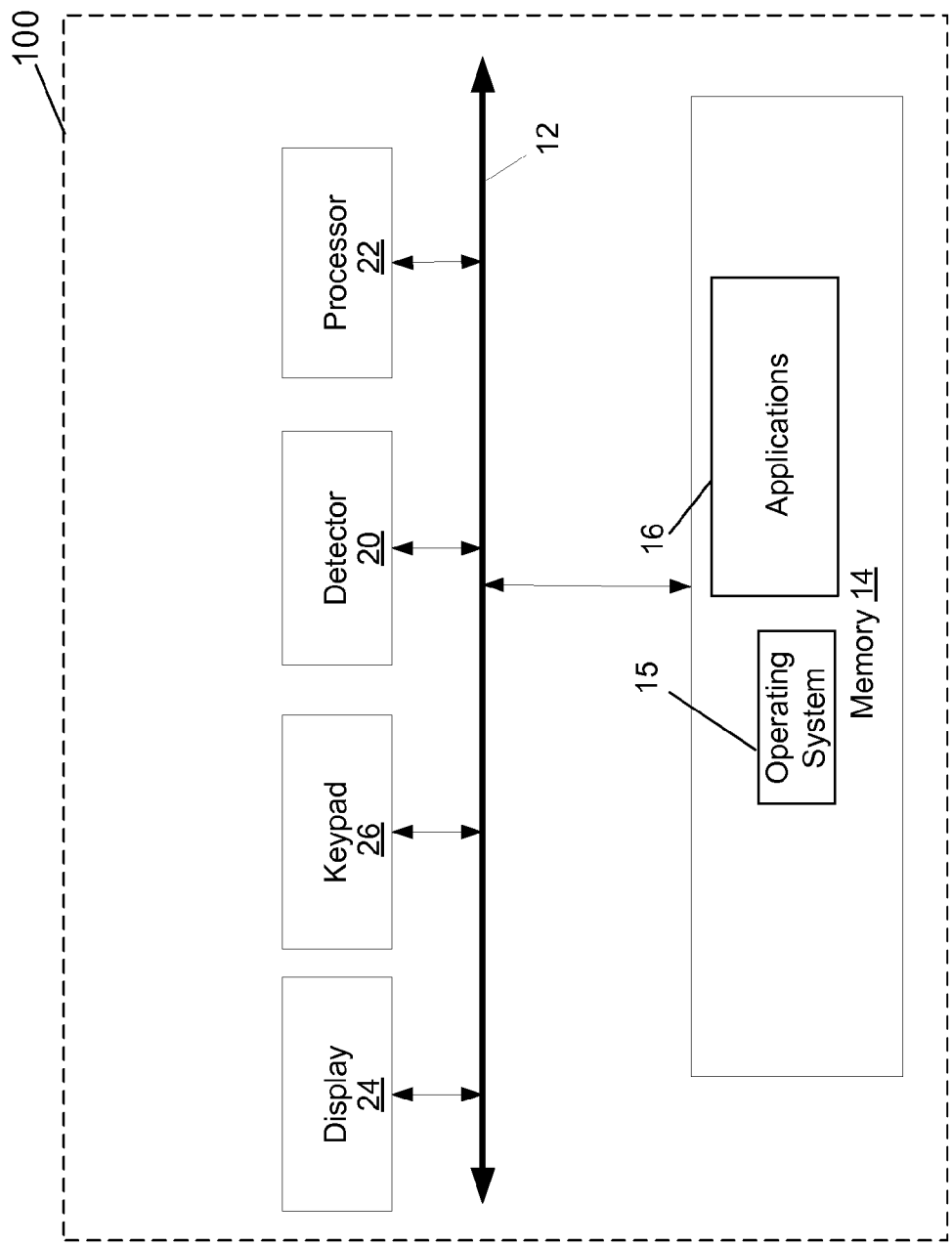
FIG. 4 illustrates an example of an apparatus, according to one embodiment.

FIG. 4 illustrates an apparatus 100 that may be configured to optimally select a shared hardware component scheduling strategy, according to one embodiment. In some embodiments, the apparatus 100 is implemented in an electronic device, such as a computing system, telephone, wireless communications device, gaming system, music or media player, personal data assistant (PDA), or any other device or system capable of wireless communication.

Apparatus 100 may include a communications interface 12, such as a bus or other communications mechanism, for communicating information between components of apparatus 100. Alternatively, the components of apparatus 100 may communicate directly with each other, without use of communications interface 12.

Apparatus 100 also includes a processor 22, coupled to communications interface 12, for receiving, managing, and/or processing user input or information, and for executing instructions or operations. Processor 22 may be any type of general or specific purpose processor. In one embodiment, processor 22 may be included within an application specific integrated circuit (ASIC).

Apparatus 100 further includes a memory 14 for storing information and instructions to be executed by processor 22. Memory 14 can be comprised of any combination of random access memory (RAM), read only memory (ROM), static storage such as a magnetic or optical disk, or any other type of machine or computer readable media. Computer readable media may be any available media that can be accessed by processor 22 and could include volatile or nonvolatile media, removable or non-removable media, and communication media. Communication media may include computer program code or instructions, data structures, program modules or other data, and includes any information delivery media.

Processor 22 can further be coupled, via communications interface 12 or directly, to a graphical user interface or display 24, such as a thin film transistor (TFT) liquid crystal display (LCD), for displaying information to a user. In some embodiments, display 24 can be a touch screen display that allows a user to interact directly with what is presented on display 24 by using their finger, hand, stylus, or another passive object. However, in other embodiments, display 24 may be a standard display, such as an LCD, that can be interacted with via a keypad 26 or cursor control device 28, such as a computer mouse.

Apparatus 100 can further include a sensor or detector 20 for detecting and receiving some input provided, for example, by a user by means of display 24, keyboard 26, and/or cursor control device 28. Detector 20 can be a separate component of apparatus 100 or, alternatively, detector 20 can be included as a function of processor 22.

In one embodiment, memory 14 stores software modules or applications that provide functionality when executed by processor 22. The modules may include an operating system 15 that provides operating system functionality for apparatus 100. The memory 14 may also store applications 16, such as text editing or messaging applications, games, web browsers, etc.

According to certain embodiments, processor 22, together with memory 14, can control apparatus 100 to measure the scheduling workload, and compare the measured scheduling workload with a utilization threshold. In one embodiment, the scheduling workload is a multi-radio RF hardware scheduling workload. The apparatus is then controlled to dynamically select the more optimal shared hardware component scheduling strategy based on the result of the comparison between the measured scheduling workload and the utilization threshold. More specifically, the processor 22 and memory 14 are configured to control apparatus 100 to determine whether the scheduling workload exceeds the threshold. If the scheduling workload exceeds the threshold, then apparatus 100 is controlled to select the eager scheduling strategy. If, however, the scheduling workload does not exceed the threshold, then apparatus 100 is controlled to select the lazy scheduling strategy.

As a result, embodiments of the invention provide a mechanism for resource allocation that is optimized to achieve less processor cycles, utilize less memory, and consume less energy It should be noted that some of the functional features described in this specification have been presented as modules, functions or applications, in order to more particularly emphasize their implementation independence. For example, a module, function or application may be implemented as a hardware circuit comprising custom VLSI circuits or gate arrays, off-the-shelf semiconductors such as logic chips, transistors, or other discrete components. A module, function or application may also be implemented in programmable hardware devices such as field programmable gate arrays, programmable array logic, programmable logic devices or the like.

Modules, functions or applications may also be partially or completely implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve its stated purpose.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

Therefore, one having ordinary skill in the art will readily understand that the invention as discussed above may be practiced with steps in a different order, may be practiced with hardware elements in configurations which are different than those which are disclosed, and that embodiments may be combined in any appropriate manner. Accordingly, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method, comprising:
    measuring a multi-radio radio frequency hardware scheduling workload;
    comparing the measured multi-radio radio frequency hardware scheduling workload with a threshold; and
    dynamically selecting a more optimal shared hardware component scheduling strategy based on a result of the comparing,
    wherein the measuring comprises measuring the multi-radio radio frequency hardware scheduling workload based on at least one of a rate of rejected jobs, radio protocol modes, and utilization rate of radio frequency hardware components.

2. The method according to claim 1, wherein the dynamically selecting comprises selecting one of an eager scheduling strategy or a lazy scheduling strategy.

3. The method according to claim 2, wherein the selecting comprises selecting the eager scheduling strategy when the result of the comparing is that the measured multi-radio radio frequency hardware scheduling workload exceeds the threshold.

4. The method according to claim 2, wherein the selecting comprises selecting the lazy scheduling strategy when the result of the comparing is that the measured multi-radio radio frequency hardware scheduling workload does not exceed the threshold.

5. The method according to claim 1, wherein radio protocol modes comprise at least one of off-line, idle, scanning, active, multiple-input multiple-output (MIMO), ad-hoc, infrastructure, power-save, radio resource control connected, and radio resource control idle.

6. The method according to claim 1, wherein the comparing comprises comparing the measured multi-radio radio frequency hardware scheduling workload with the threshold selected by a user.

7. An apparatus, comprising:
    at least one processor; and
    at least one memory including computer program code;
    the at least one memory and the computer program code configured, with the at least one processor, to cause the apparatus at least to
    measure a multi-radio radio frequency hardware scheduling workload;
    compare the measured multi-radio radio frequency hardware scheduling workload with a threshold; and dynamically select a more optimal shared hardware component scheduling strategy based on a result of the comparison,
wherein the at least one memory and the computer program code are further configured, with the at least one processor, to cause the apparatus at least to measure the multi-radio radio frequency hardware scheduling workload based on at least one of a rate of rejected jobs, radio protocol modes, and utilization rate of radio frequency hardware components.

8. The apparatus according to claim 7, wherein the at least one memory and the computer program code are further configured, with the at least one processor, to cause the apparatus at least to dynamically select one of an eager scheduling strategy or a lazy scheduling strategy.

9. The apparatus according to claim 8, wherein the at least one memory and the computer program code are further configured, with the at least one processor, to cause the apparatus at least to select the eager scheduling strategy when the result of the comparing is that the measured multi-radio radio frequency hardware scheduling workload exceeds the threshold.

10. The apparatus according to claim 8, wherein the at least one memory and the computer program code are further configured, with the at least one processor, to cause the apparatus at least to select the lazy scheduling strategy when the result of the comparing is that the measured multi-radio radio frequency hardware scheduling workload does not exceed the threshold.

11. The apparatus according to claim 7, wherein radio protocol modes comprise one of off-line, idle, scanning, active, multiple-input multiple-output (MIMO), ad-hoc, infrastructure, power-save, radio resource control connected, and radio resource control idle.

12. The apparatus according to claim 7, wherein the threshold is selected by a user.

13. The apparatus according to claim 8, wherein the eager scheduling strategy and the lazy scheduling strategy relate to a decision window of scheduling, and wherein the eager scheduling strategy and the lazy scheduling strategy differ as to the time that scheduling decisions are made.

14. A computer program, embodied on a non-transitory computer readable storage medium, the computer program configured to control a processor to perform operations, comprising:
measuring a multi-radio radio frequency hardware scheduling workload;
comparing the measured multi-radio radio frequency hardware scheduling workload with a threshold; and
dynamically selecting a more optimal shared hardware component scheduling strategy based on a result of the comparing,
wherein the measuring comprises measuring the multi-radio radio frequency hardware scheduling workload based on at least one of a rate of rejected jobs, radio protocol modes, and utilization rate of radio frequency hardware components.

15. The computer program according to claim 14, wherein the dynamically selecting comprises selecting one of an eager scheduling strategy or a lazy scheduling strategy.

16. The computer program according to claim 15, wherein the selecting comprises selecting the eager scheduling strategy when the result of the comparing is that the measured multi-radio radio frequency hardware scheduling workload exceeds the threshold.

17. The computer program according to claim 15, wherein the selecting comprises selecting the lazy scheduling strategy when the result of the comparing is that the measured multi-radio radio frequency hardware scheduling workload does not exceed the threshold.

* * * * *